US00RE37098E

(19) United States
(12) Reissued Patent
Lansberry

(10) Patent Number: US RE37,098 E
(45) Date of Reissued Patent: Mar. 20, 2001

(54) EARTH-BASED VEHICLE

(75) Inventor: John B. Lansberry, Woodland, PA (US)

(73) Assignee: Tract-A-Pillar Tractor Co., Woodland, PA (US)

(21) Appl. No.: 09/200,971

(22) Filed: Nov. 30, 1998

Related U.S. Patent Documents

Reissue of:
(64) Patent No.: 5,615,748
Issued: Apr. 1, 1997
Appl. No.: 08/598,530
Filed: Feb. 8, 1996

(51) Int. Cl.[7] ..... B62D 55/02
(52) U.S. Cl. ..... 180/9.36; 180/9.38; 180/9.42
(58) Field of Search ..... 180/6.24, 6.62, 180/6.7, 9.1, 9.34, 9.36, 9.42, 9.38, 307

(56) References Cited

U.S. PATENT DOCUMENTS

| | | | |
|---|---|---|---|
| 1,287,261 | 12/1918 | Domer | 180/9.38 |
| 1,292,047 | 1/1919 | Rackstraw | 180/9.38 |
| 1,298,127 | 3/1919 | Wagenhals | 180/9.36 |
| 1,324,974 | 12/1919 | Miller | 180/9.38 |
| 1,366,413 | 1/1921 | Olin . | |
| 2,161,760 | 6/1939 | Hacker | 180/9.38 |
| 2,541,943 | 2/1951 | Sherman et al. | 180/9.38 |
| 2,572,399 | 10/1951 | Sklovsky et al. | 180/9.38 X |
| 3,710,882 | 1/1973 | Marceau | 180/9.38 |
| 3,812,926 | 5/1974 | Tidwell | 180/9.38 X |
| 3,840,084 | 10/1974 | Mantha | 180/9.38 |
| 4,865,142 | 9/1989 | Roy | 180/9.38 |
| 4,888,949 * | 12/1989 | Rogers | 180/307 |

FOREIGN PATENT DOCUMENTS

| | | |
|---|---|---|
| 422842 | 3/1924 | (DE) . |
| 627092 | 5/1933 | (DE) . |
| 1 192 931 | 5/1965 | (DE) . |
| 0 165 062 | 12/1985 | (EP) . |
| 355553 | 8/1931 | (GB) . |

* cited by examiner

*Primary Examiner*—Kevin Hurley
(74) *Attorney, Agent, or Firm*—Pillsbury Madison & Sutro LLP

(57) ABSTRACT

A vehicle is provided including a main frame structure, a track assembly mounted to the main frame structure and having a single, endless ground-engaging track extending in a longitudinal direction. A pair of steerable ground-engaging wheels flank the track, constructed and arranged to exert a ground bearing pressure sufficient to change a direction of travel of the track in response to turning of the wheels to steer the vehicle. Steering structure is operatively associated with the wheels to turn the wheels. Power drive structure is mounted with respect to the main frame structure and is constructed and arranged to drive the wheels and the track simultaneously so as to move the vehicle along the ground. The wheels are constructed and arranged to be moved with respect to the main frame structure so as to change a position thereof with respect to the main frame structure, thereby permitting driving, steering and ground pressure of the vehicle to be adjusted in accordance with ground conditions.

48 Claims, 11 Drawing Sheets

EARTH-BASED VEHICLE

Matter enclosed in heavy brackets [ ] appears in the original patent but forms no part of this reissue specification; matter printed in italics indicates the additions made by reissue.

*Further reissue of this patent is sought in a continuing reissue application, Ser. No. 09/577,261, filed May 22, 2000.*

BACKGROUND OF THE INVENTION

The present invention relates to vehicles and, more particularly, to an earth-based carrier vehicle which is constructed and arranged to put all tractive forces to the ground, thereby permitting the vehicle to negotiate terrain having a variety of soil conditions.

Conventional vehicles such as loaders and/or bulldozers are usually driven by tracks or by wheels. Typical track vehicles employ a pair of spaced steel or rubber endless tracks which are driven to move the vehicle over the ground. Wheeled vehicles typically include a pair of front wheels and a pair of rear wheels which are driven to propel the vehicle. The wheels are generally large and have tread designs which aid in moving the vehicle over sand, clay and mud. These conventional vehicles, although capable of moving over terrain having a variety of soil conditions, may often get stuck, since all of the tractive forces and propelling surfaces are not always put to the ground.

Recently, environmental concerns have been raised due to the disruption of the earth's crust by use of the conventional loader/dozer type vehicles. For example, in the tree harvesting industry, construction industry and/or the agricultural industry, the operation of vehicles of the type described may cause significant damage to the earth's crust. Damage can occur by the formation of ruts or by causing soil erosion.

Accordingly, there exists a need to provide an improved earth-based carrier vehicle which may traverse terrain having a variety of soil conditions with minimal disturbance of the earth's crust.

SUMMARY OF THE INVENTION

It is an object of the invention to provide an earth-based carrier vehicle to fulfill the need referred to above. In accordance with the principles of the present invention, this objective is obtained by providing a vehicle including a main frame structure, a track assembly mounted to the main frame structure and having an single, endless ground-engaging track extending in a longitudinal direction. A pair of steerable ground-engaging wheels are mounted with respect to the frame structure so that each wheel flanks the track. The wheels are constructed and arranged to exert a ground bearing pressure sufficient to change a direction of travel of the track in response to turning the wheels so as to steer the vehicle. Steering structure is operatively associated with the wheels for turning the wheels. Power drive structure is mounted with respect to the main frame structure and is constructed and arranged to drive the wheels and the track simultaneously so as to move the vehicle along the ground.

The wheels are constructed and arranged to be moved with respect to the main frame structure so as to change a position thereof with respect to the main frame structure, thereby permitting driving, steering and ground pressure of the vehicle to be adjusted in accordance with ground conditions.

Other objects, features and characteristics of the present invention, as well as the methods of operation and functions of the related elements of the structure, and the combination of the parts and economics of manufacture, will become more apparent upon consideration of the following detailed description and appended claims, with reference to the accompanying drawings, all of which form a part of this specification.

DETAILED DESCRIPTION OF THE PRESENTLY PREFERRED EXEMPLARY EMBODIMENTS

Figure 1:
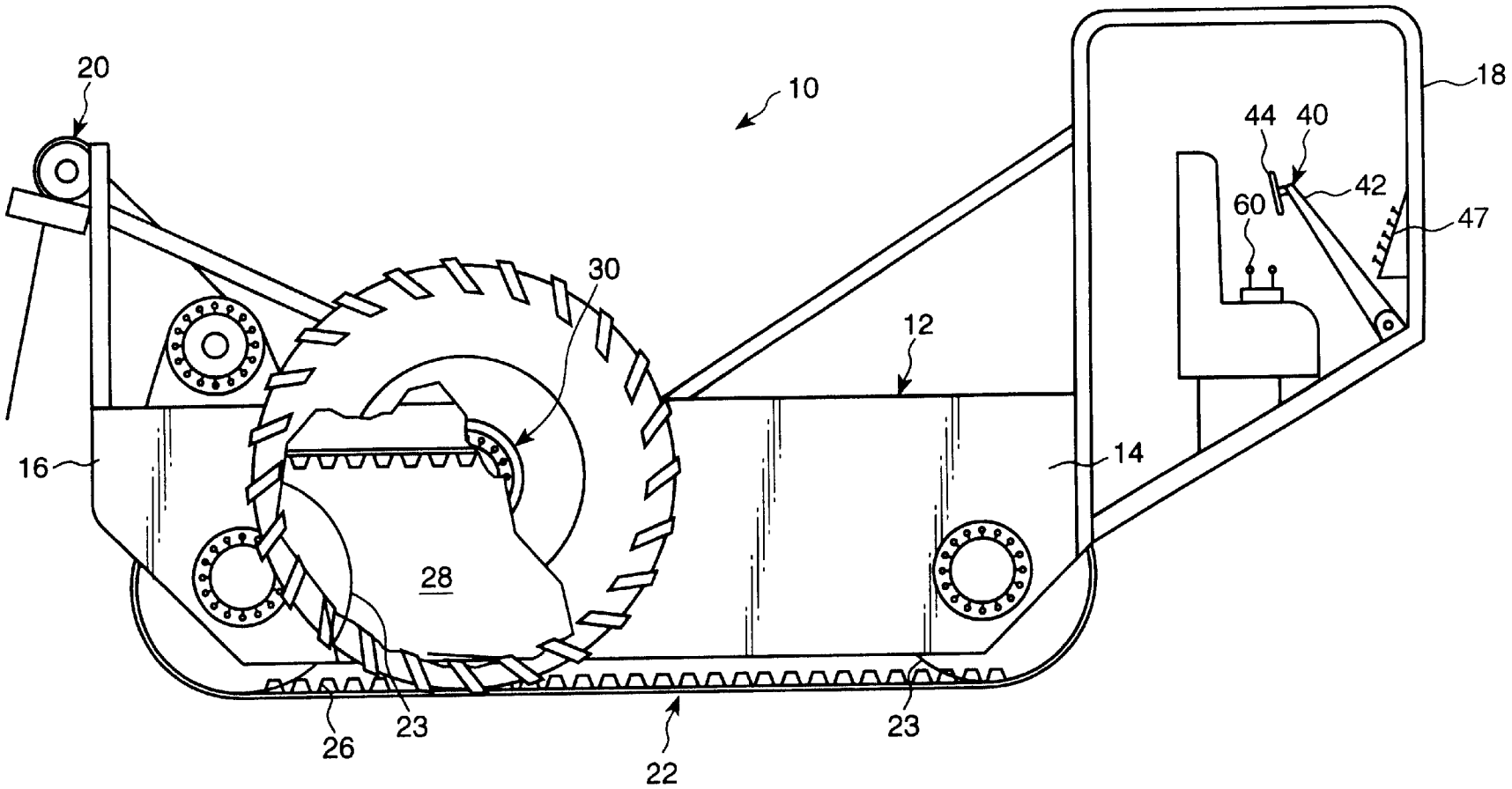
FIG. 1 is a schematic side view of a earth-based carrier vehicle embodying the principles of the present invention, shown with a pair of wheels disposed in an aft position.

Referring to the drawings, an earth-based carrier vehicle is shown generally indicated at 10, which embodies the principles of the present invention.

The vehicle 10 includes a main frame structure, generally indicated at 12, in the form of a vehicle chassis, having fore and aft ends, 14 and 16, respectively. In the illustrated embodiment, an operator compartment 18 is mounted to the fore end 14 of the frame structure 12, while a winch or other attachment assembly, generally indicated at 20, is mounted to the aft end 16.

In accordance with the principles of the present invention, the vehicle 10 includes a track assembly, generally indicated at 22, mounted to the frame structure 12. The track assembly 22 may comprise one or more endless track belt units. In the illustrated embodiment, the track assembly 22 is in the form of a single, centrally mounted track unit having a conventional ground-engaging endless track or belt 26 extending in the longitudinal direction. The track assembly 22 may be of conventional configuration; for example, Model MP73, manufactured by Caterpillar Industrial Products Inc., of Peoria, Ill., may be employed. Two wheel rear drive or an all wheel drive track assembly is within the contemplation of the invention. It is preferred that the track assembly be powered, such as the conventional lug and sprocket-type arrangement, whereby belt or track lugs engage track wheel sprockets. Alternatively, the track assembly may be of the friction-type whereby the track or belt frictionally engages the track wheels of the assembly.

In the illustrated embodiment, two hydraulic motors MA and MB (shown schematically in FIG. 4A) are provided, with one motor coupled to an associated drive wheel 23 of the track assembly 22 for driving the track 26. The motors MA and MB are conventional, such as a Heavy Duty XL-1120cc radial piston motor, with hub mount, manufactured by Rotary Power. The motors MA and MB are preferably of the fixed displacement-type but are capable of "free wheeling", unpowered operation.

It is within the contemplation of the invention to employ a conventional mechanical transmission to drive the track 26 in lieu of hydraulic power.

Figure 10A:
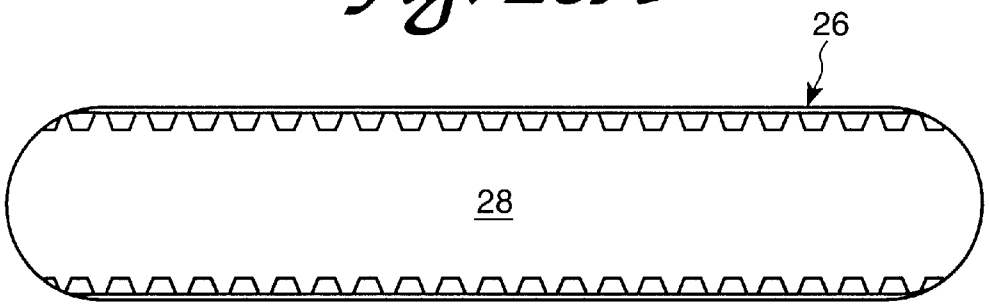
FIGS. 10A, 10B and 10C show examples of track profiles for the track of the vehicle of the invention.
Figure 10B:
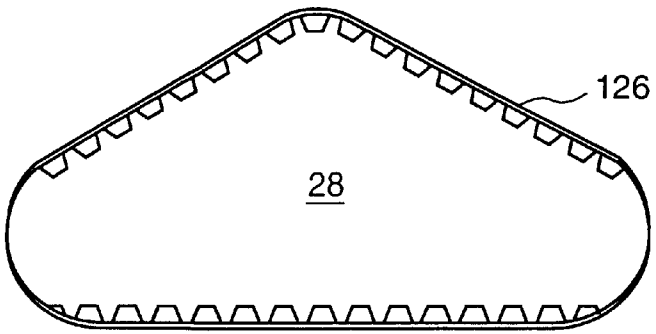
Figure 10C:
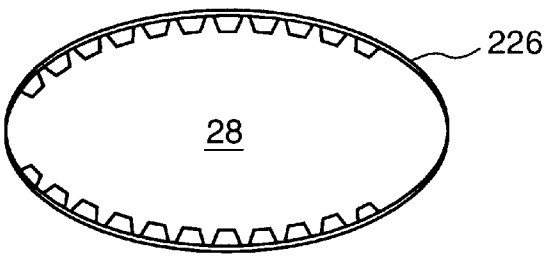

The track 26 may be a rubber or steel track, however, rubber is preferred. The bounds or inner periphery of the track 26 defines an interior space or envelope 28, the function of which will become apparent below. The track 26 may have various profiles, as shown by the tracks 26, 126 and 226, respectively, in FIGS. 10A–10C.

Figure 3:
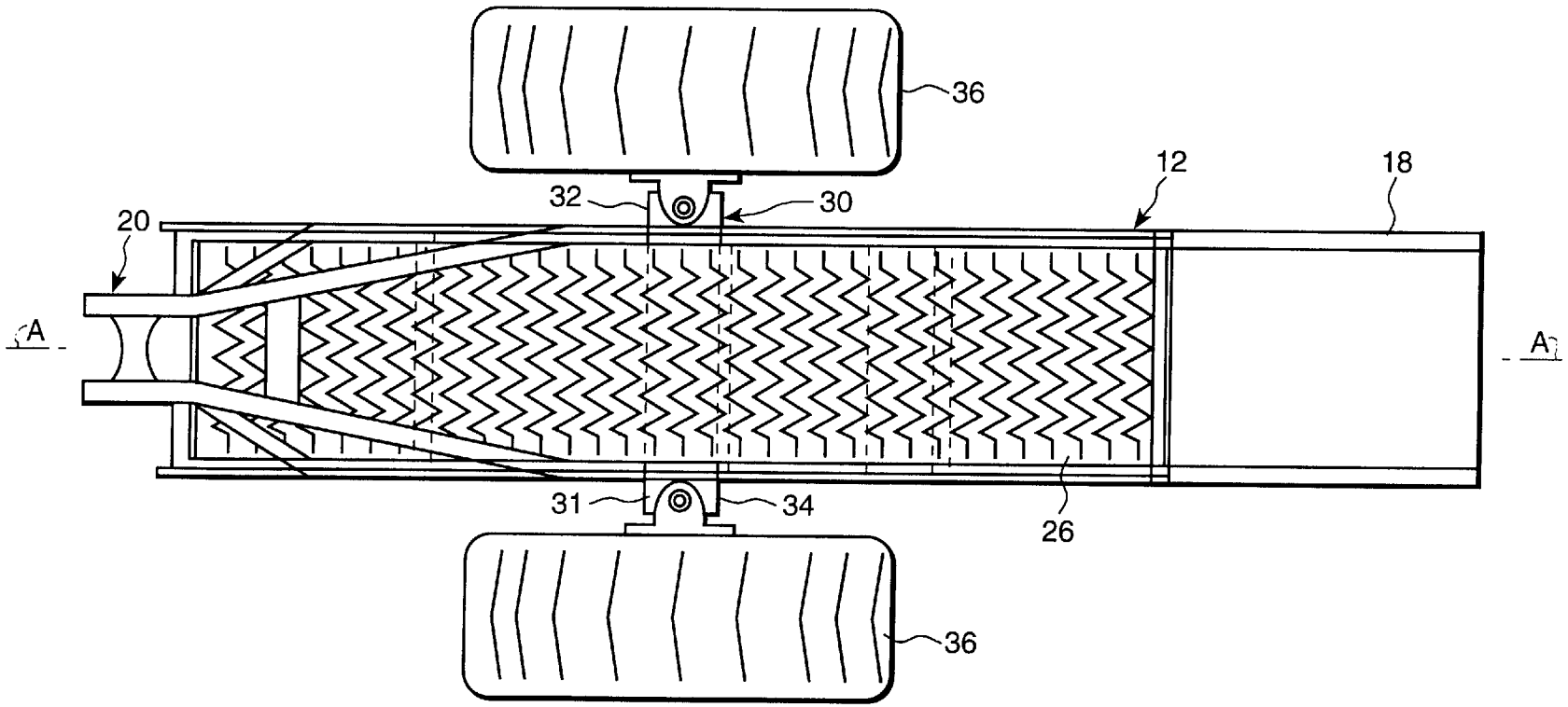
FIG. 3 is a schematic plan view of the vehicle of FIG. 1.

An axle assembly, generally indicated at 30, is mounted with respect to the frame structure 12. The axle assembly 30 has opposing ends 32 and 34, respectively, which are disposed generally transversely to the longitudinal extent of the track 26 outside of the envelope 28 at positions adjacent the track 26. As shown in FIG. 3, a portion of the axle assembly 30 extends through the envelope 28 of the track assembly 22. A pair of steerable wheels are provided, with one wheel 36 being coupled to a respective end of the axle assembly 22. Thus, as shown, the wheels flank the track 26 and are arranged with respect to the track so that the wheels engage the ground surface at a position deeper into the ground than the engagement position of the track with the ground surface, the function of which will become apparent below.

The axle assembly 30 is a conventional, of the driving and steering type, and may be, for example, a John Deere TeamMate™II 1150 Series Steerable Axle manufactured by Deere Power Systems of Waterloo, Iowa. For the steering function, the TeamMate™II 1150 Series Steerable Axle includes steering structure in the form of dual double-acting hydraulic cylinders and a tie-rod. It can be appreciated that the wheel mounting assembly or axle assembly can be of any construction which provides both driving and steering of the wheels 36.

In the illustrated embodiment, one hydraulic motor MC (FIG. 4A) is coupled to the axle assembly 30 differential to drive the wheels 36. The motor MC is conventional, such as a Series 90 75cc 2-speed motor manufactured by Sauer Sundstrand Company of Ames, Iowa. The motor MC is preferably a variable displacement-type motor and is operated at either maximum or minimum displacement as determined by the operator, as will be explained in more detail below. Although one motor is used in the illustrated embodiment, it is within the contemplation of the invention to provide the appropriate number of hydraulic motor(s) to operate the particular axle assembly selected.

Although a hydraulic motor is used to drive the wheels 36, it is within the contemplation of the invention to employ mechanical means such as a transmission coupled to the drive shaft of the axle assembly 30 to drive the wheels 36 in the known manner. Further, although only a pair of wheels are provided in the illustrated embodiment, it can be appreciated that front and rear wheel pairs may be provided of such arrangement to provide both driving and steering functions.

In the illustrated embodiment, steering of the wheels 36 is achieved hydraulically. Thus, the steering structure includes a hydraulic steering unit, generally indicated at 40 (FIGS. 1 and 4B). The steering unit 40 is conventional and may be, for example, the Danfoss OSPB ON open center, non-reaction steering unit. Thus, in the illustrated embodiment, there is no mechanical connection between the steering column 42 and the steered wheels 36. Instead, in the conventional manner, hydraulic hoses are connected between the steering unit 40 and the hydraulic steering cylinders 39 of the axle assembly 30. One hydraulic cylinder 39 is associated with each wheel 36. With reference to FIG. 4B, when the steering wheel 44 is turned, the steering unit 40 meters an oil volume proportional to the rate of rotation of the steering wheel 44. This volume is directed to the appropriate side of a steering cylinder 39 of the steering structure, while displaced oil is directed to the reservoir 46. Although hydraulic power is employed to turn the wheels 36, it is within the contemplation of the invention to employ mechanical means such as linkages, as steering structure, to turn the wheels 36. Further, it is within the contemplation of the invention to employ a center-pivoted rigid axle for steering the wheels 36.

The wheels 36 preferably include rubber tires. However, it can be appreciated that steel wheels can also be employed. Thus, it is within the contemplation of the invention to employ a rubber track and rubber tires, or a steel track and steel wheels, or rubber tires and a steel track, or steel wheels and a rubber track. The material used for the track and wheels/tires may be selected based upon the particular vehicle application.

Power drive structure, generally indicated at 50, includes the power operated equipment necessary to drive the wheels 36 and to drive the track 26. In the illustrated embodiment, the power drive structure includes a power unit, generally indicated at 51, including an internal combustion engine 52, a pump drive gear box 54 coupled to the engine 52 and a hydrostatic transmission pump 56 coupled to the gear box 54. The power unit 51 is mounted within the envelope 28. Motors MA, MB and MC are also considered part of the drive structure. The engine 52 drives the hydraulic transmission pump 56, which is fluidly connected to the two track hydraulic motors MA and MB to drive the track 26, and fluidly connected to the hydraulic motor MC of the axle assembly 30 to drive the wheels 36. The hydraulic pump 56 is conventional and may be, for example, a Series 90, 75 cc/rev hydrostatic pump, manufactured by Sauer Sundstrand Company. The engine 52 may be conventional, such as the Model 4045T PowerTech 4.5L engine manufactured by Deere Power Systems of Waterloo, Iowa. In the illustrated embodiment, the pump gear box 54, mounted to engine 52 is a Series 28000 Double 6 inch type, manufactured by Funk Manufacturing Company. The gear box 54 is provided so as to operate two pumps, pump 56 and pump unit 57 off the engine 52. Pump unit 57 (FIG. 4A) is a tandem gear pump employed to operate the steering unit 40 (FIG. 4B) of the vehicle and any vehicle accessories such as a dozer blade 110 (FIG. 8) mounted on the vehicle, as explained in more detail below. Pump unit 57 is conventional, such as a Barnes gear pump Model G-20, for operating the accessories, with a Barnes Series 900 piggyback gear pump coupled thereto, for operating the steering unit 40.

As noted above, it can be appreciated that in lieu of or in combination with the hydrostatic pump 56 and hydraulic motors to drive the track 26 and wheels, the power drive structure may include mechanical means such as a mechanical transmission to facilitate driving the track 26 and the wheels 36.

The vehicle 10 is driven by the hydrostatic transmission pump 56 delivering hydraulic fluid such as oil to the two track motors MA and MB and the axle motor MC. Drive speed is determined by the number of motors selected to operate at the same time. Selection of operation of the motors is performed through an electrical switch operated, solenoid controlled, high pressure poppet valves, (S1–S9 in FIG. 4A) which are conventional and operated by switches 47 mounted within the operator compartment 18.

Figure 4A:
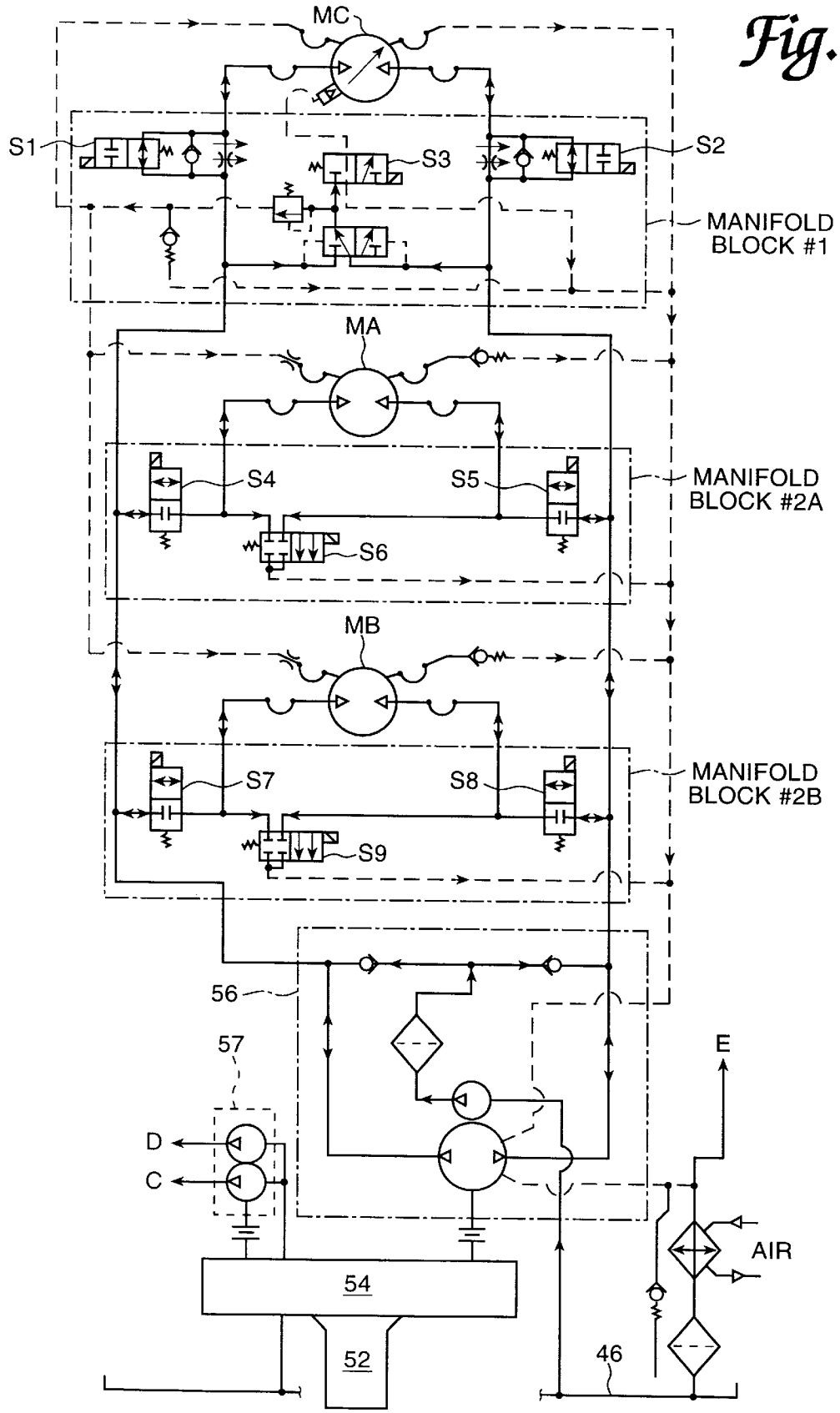
FIG. 4A is a schematic illustration of a portion of the hydraulic circuit of the vehicle of the invention for driving the wheels and the track.
Figure 4B:
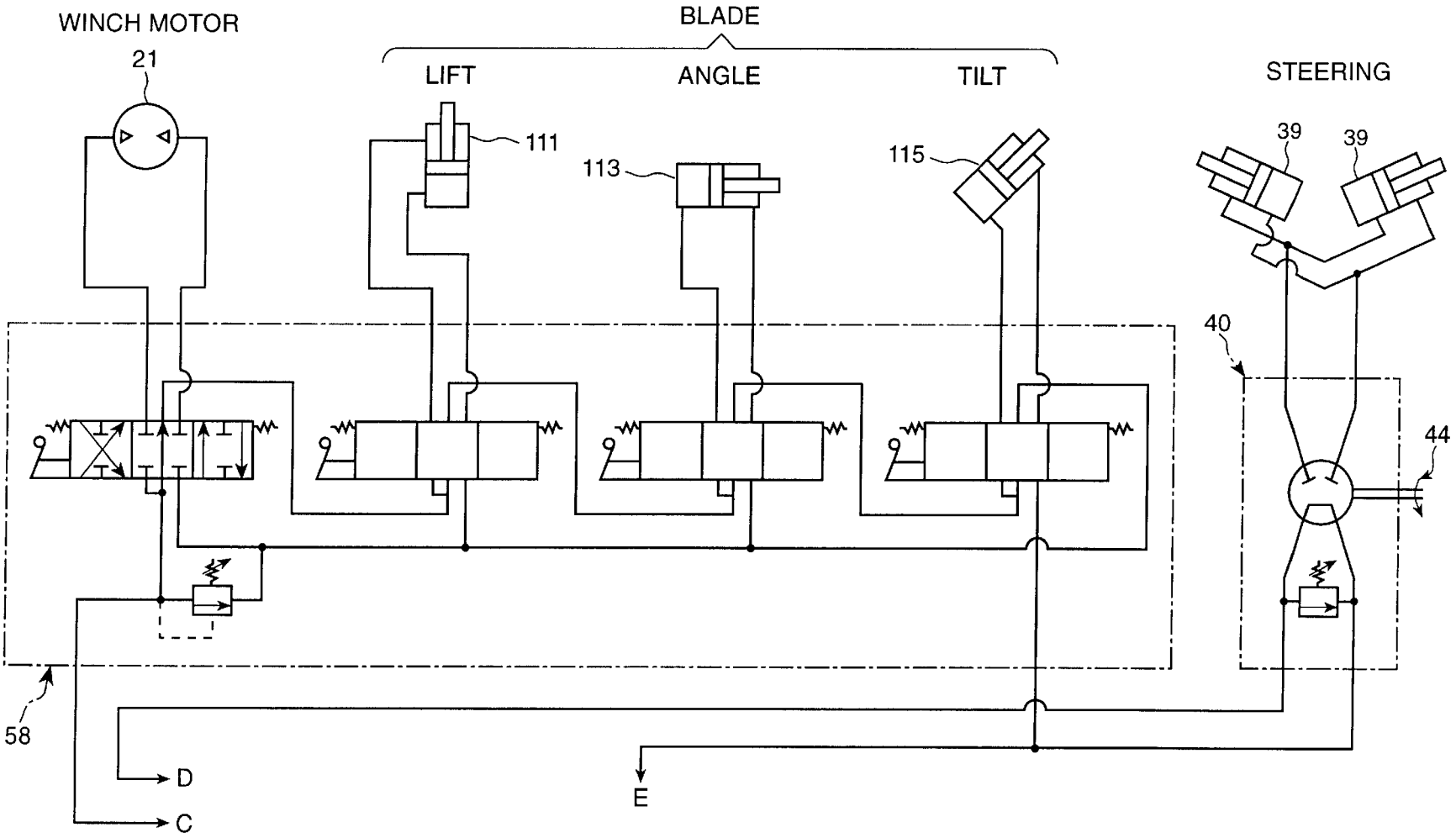
FIG. 4B is a schematic illustration of a portion of the hydraulic circuit of the vehicle of the invention for operating steering of the vehicle along with vehicle accessories.

Driving the vehicle 10 can be appreciated with reference to the hydraulic circuit shown in FIG. 4A and with reference to TABLE 1.

TABLE 1

| | S1 | S2 | S3 | S4 | S5 | S6 | S7 | S8 | S9 |
|---|---|---|---|---|---|---|---|---|---|
| LOW SPEED | X | X | | X | X | | X | X | |
| 2ND SPEED | | | | X | X | | | | X |
| 3RD SPEED | | | | | | X | | | X |
| 4TH SPEED | | | X | | | X | | | X |

TABLE 1 shows the particular solenoid valves, S1–S9, which are energized in various combinations resulting in various vehicle speeds. At low speed, solenoid valves S1, S2, S4, S5, S7 and S8 are energized. Thus, the axle motor MC is at maximum displacement and the track motors MA and MB are both operating. At this speed, solenoid valves S1 and S2 are energized only to limit wheel spin. At the second speed, solenoid valves S4, S5, and S9 are energized. Thus, the axle motor MC is at maximum displacement and the track motor MA is operating while track motor MB is free wheeling. At the third speed, solenoid valves 6 and 9 are energized. The axle motor MC is at maximum displacement and the track motors MA and MB are free wheeling. At the fourth speed and fastest speed, solenoid valves S3, S6 and S9 are energized. Thus, the axle motor MC is at minimum displacement and the track motors MA and MB are free wheeling. Thus, it can be appreciated that the wheels 36 and track 26 are driven simultaneously to propel the vehicle.

Forward, stop and reverse control is determined by an operator control lever position. The lever 60 is connected preferably via a push-up cable (not shown) to a manual direction servo control valve located on the hydrostatic transmission pump 56 to control the pump 56. However, it can be appreciated that the pump 56 may be controlled electrically. Movement of the lever 60 in the forward direction from a middle or stop position will produce forward vehicle movement. The further forward the lever 60 is pushed, the faster the travel rate of the vehicle becomes. Movement of the lever 60 in the reverse direction or towards the operator produces rearward travel in a similar way. Since the vehicle is hydraulically operated, oil flow and pressure are factors in controlling speed, torque, and thus tractive effects on the wheels 36 and track 26.

It is within the contemplation of the invention to provide an additional valve (not shown) into the hydraulic circuit to provide a parking brake. The brake can be mounted on the track drive and can be powered off and spring applied.

Figure 8:
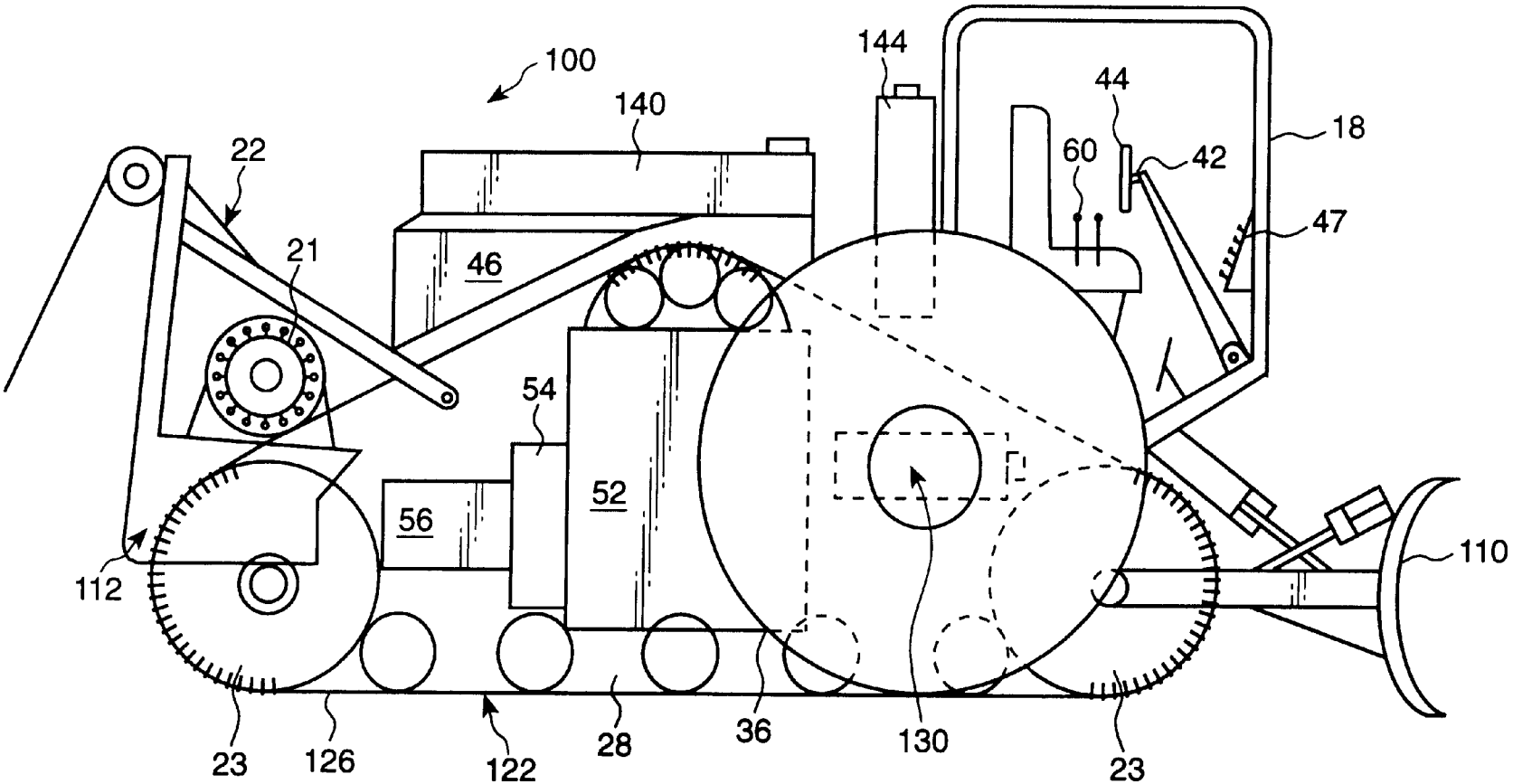
FIG. 8 is a schematic illustration of the vehicle of the invention having a vertically movable axle assembly.

The remainder of the hydraulic circuit as shown in FIG. 4B is variable and applies to the support circuitry for use with one or more attachments fixed to the vehicle. For example, FIG. 8 shows a vehicle 100 of the invention including a dozer blade 110. As shown in FIG. 4B, the pump unit 57 operates the motor 21 of the winch assembly 20 and the hydraulic cylinders 111, 113 and 115 of the dozer blade 110 via a control valve module, generally indicated at 58. The Danfoss PVG 32 valve module may be used as the control valve module 58. With reference ! to the drawings, it can be appreciated that the tandem pump unit 57 of FIG. 4A is coupled to the hydraulic circuit portion of FIG. 4B at points C and D, while the steering portion of the circuit of FIG. 4B is coupled to the circuit of FIG. 4A at E.

The axle assembly 30 may be fixed with respect to the main frame structure 12. When the axle assembly 30 is fixed, the vehicle is steered by the wheels 36 via the steering unit 40, in the manner discussed above. In the illustrated embodiment (FIG. 1), with respect to the main frame structure, the wheels 36 are disposed at a position vertically lower than a position of the track 26 so that the wheels 36 will engage the ground at positions slightly deeper into the earth's crust than the position of the track's 26 ground contact. Further, for the best results, the wheels 36 should be disposed at the center of gravity of the vehicle to increase the tractive force at the wheels 36. Thus, even though the driven track 26 will try to maintain movement of the vehicle in the particular direction of vehicle travel, when the wheels 36 are turned to steer the vehicle, the track 26 will follow. This occurs since the wheels 36 are constructed and arranged to exert ground bearing pressure sufficient to move or nudge the track 26 and thus, change a direction of travel of the track in response to turning the wheels to steer the vehicle. Thus, upon turning the wheels to steer the vehicle, the driven track 26 will respond by sliding over the ground in the direction that the vehicle is turning.

It is preferable to mount the axle assembly 30 so as to be movable with respect to the main frame structure 12 in at least the vertical direction. Thus, the axle assembly 30 may be fixed fore and aft, yet be mounted for generally vertical movement so as to adjust the position of the wheels 36 with respect to the frame structure 12, the function of which will become apparent below.

Figure 9:
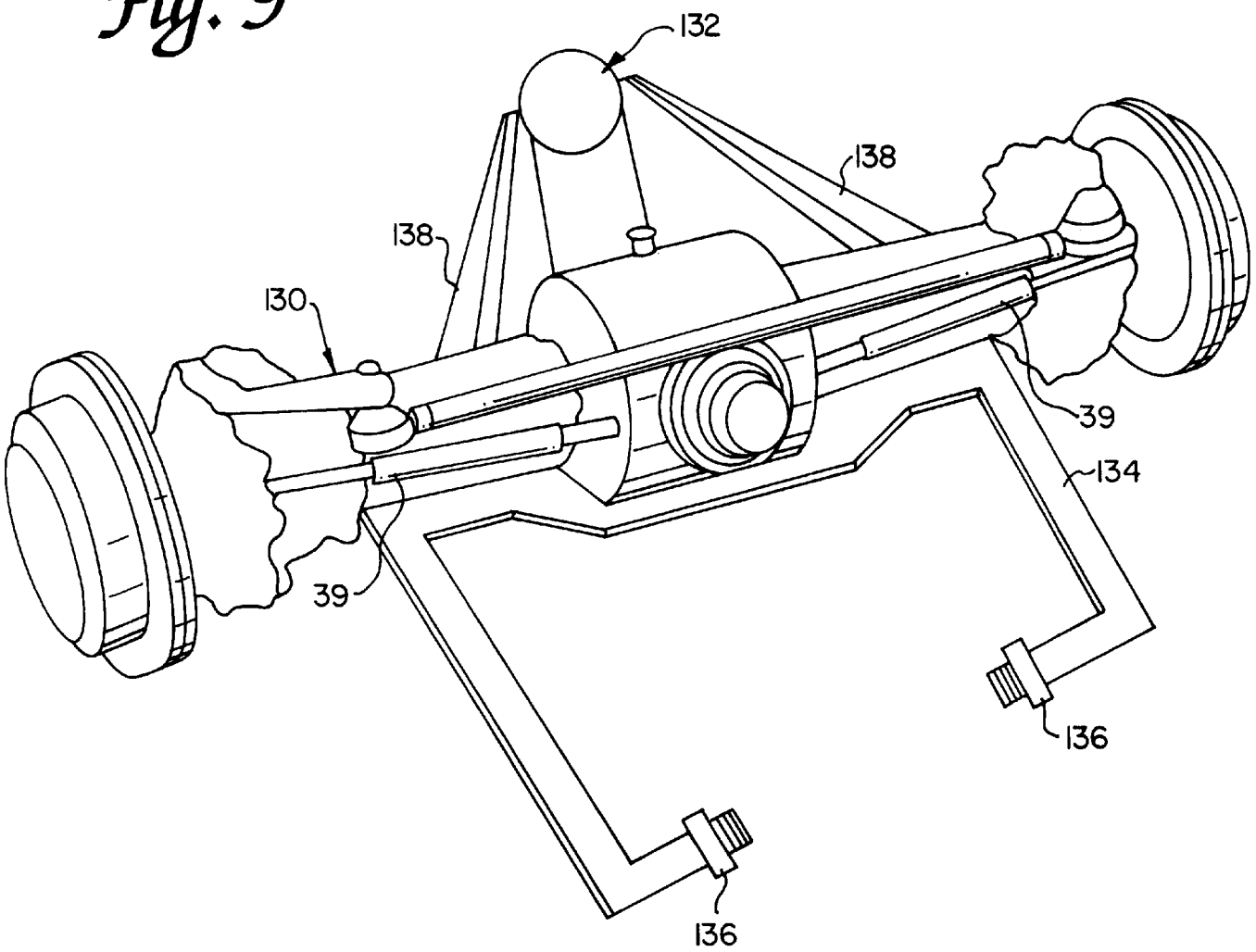
FIG. 9 is a perspective view of an air bag device mounted to the axle assembly of the vehicle of FIG. 8.

As noted above, FIG. 8 shows another embodiment of the carrier vehicle of the invention. The vehicle 100 is employed as a bulldozer having a dozer attachment 110. The axle assembly 130 of the vehicle 100 is movable vertically. With this arrangement, distribution of weight and tractive effort between the wheels 36 and the track 126 for improved driving and steering of the vehicle 100 can be achieved. As shown in FIG. 9, to move the axle assembly 130 vertically, a pneumatic air bag device, generally indicated at 132, may be mounted to an upper frame member of the frame structure 112 and bottom fixed to a hinged saddle 134 that extends to the back of the axle assembly 130. The saddle 134 is coupled to the frame structure 112 via hinge pins 136. Upon inflation, the air of the device 132 pushes the axle assembly 130 and thus the wheels 36 downwardly within the envelope, raising the track 126 off the ground at the fore end of the vehicle 100, increasing the ground bearing pressure at the wheels. Thus, the wheels 36 and only the aft end of the track 126 are in ground contact. In this position, it can be appreciated that turning of the wheels 36 would result in turning of the vehicle 100 about a small turning radius since the tractive forces are only at the wheels 36 and at the aft end of the track 126. Since a portion of the driven track 126 is out of ground contact, improved mobility of the vehicle 100 is achieved. Limit stops 138 (FIG. 9) may be provided between the air bag device 132 and the axle assembly 130 for restricting oscillatory movement of the axle assembly 130.

When the air bag of the device 132 is caused to deflate, the axle assembly 130 will move to a vertical position such that the track 126 and the wheels 36 are each in contact with the ground.

It can be appreciated that other devices, such as hydraulic or air cylinders (not shown) coupled to, for example, the center pivoting mount of the axle assembly 130, may be used to raise or lower the axle assembly 130 within the envelope 28 of the track assembly 122.

Figure 2:
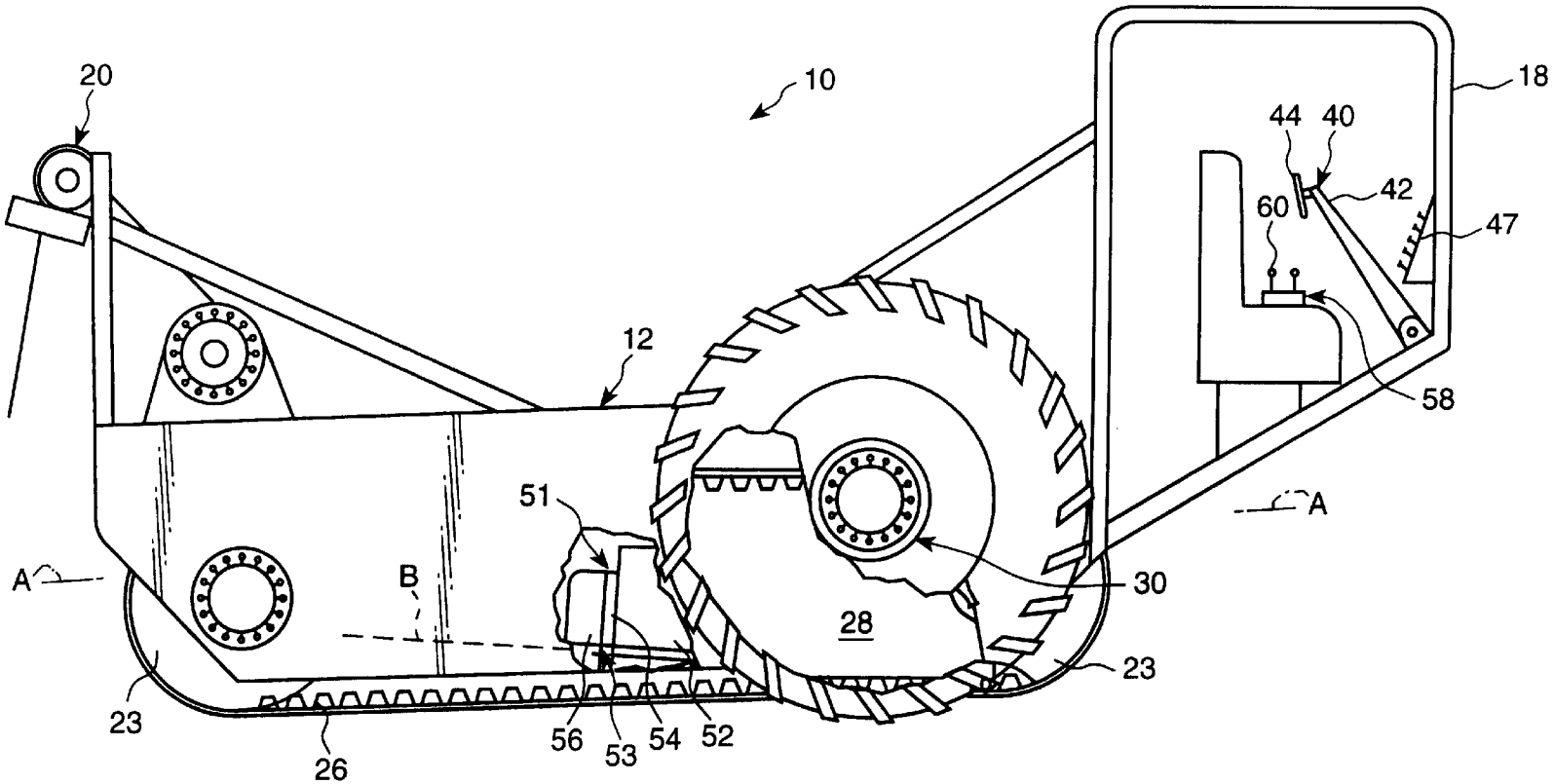
FIG. 2 is a schematic view of the carrier vehicle of FIG. 1, shown with the pair of wheels moved to a fore position.
Figure 5:
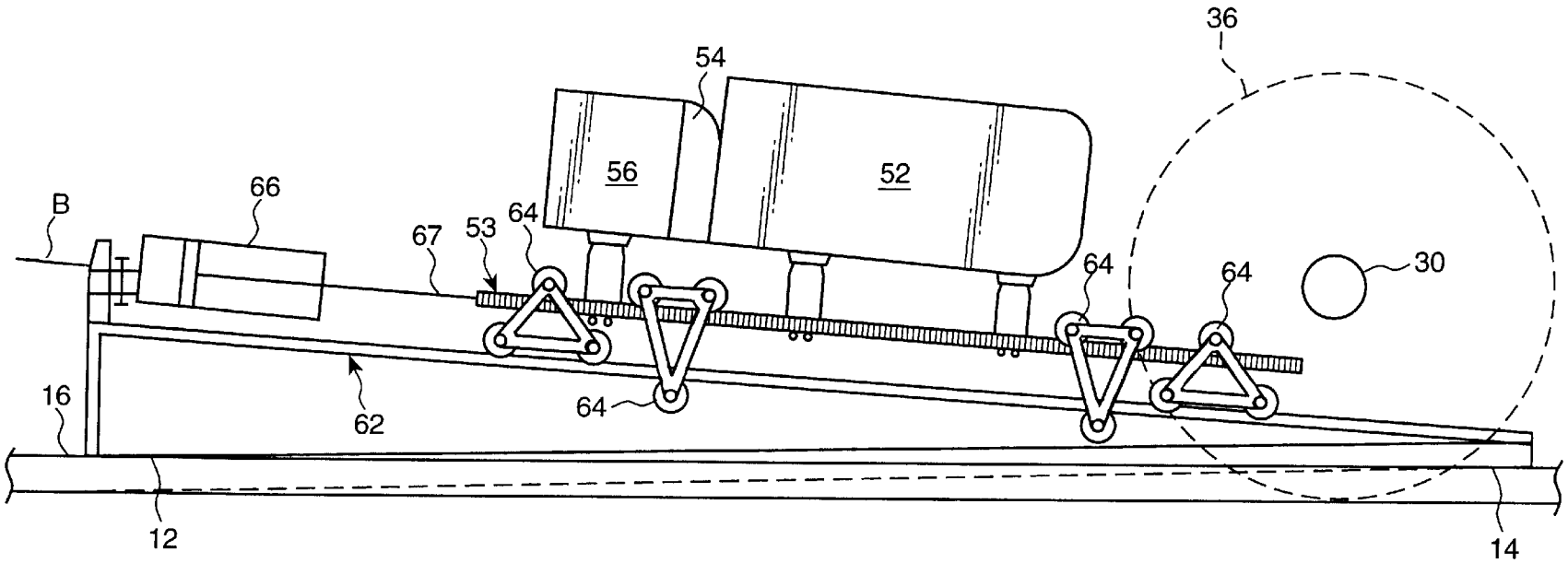
FIG. 5 is a schematic illustration showing the axle assembly and power unit of the vehicle mounted on a movable member.

In the preferred embodiment as shown in FIG. 2, the axle assembly 30 and the power unit 51 are fixedly mounted on a movable member, generally indicated at 53, so as to be movable within the envelope 28. FIG. 5 is a schematic view of the axle assembly 30 and power unit 51 mounted on the movable member, generally indicated at 53 so as to advantageously change the fore and aft center of gravity per load, attachment, or to compensate for various surface conditions which may prevail, and to change the driving and steering geometry in any working conditions.

In the illustrated embodiment, the movable member 53 is in the form of a flat plate mounted for movement along a tract frame, generally indicated at 62. The tract frame 62 is fixed to the frame structure 12 within the envelope 28. Ball bearing V-shaped rollers or cam followers 64 are employed which permit guided movement of the movable member 53 along the tract frame 62. At least one hydraulic cylinder 66 is fixed at one end to the frame structure 12. The piston end 67 of the cylinder 66 is coupled to an end of the movable member 53 such that movement of the piston moves the movable member 53 fore and aft along the tract frame 62. The cylinder(s) 66 may be incorporated into the hydraulic circuit of FIG. 4B and operated by the pump unit 57. The tract frame 62 is disposed along an axis B, which is disposed at an angle with respect to horizontal (axis A). Thus, as shown in FIG. 1, when the movable member 53 is in the aft position, the axle assembly 30 and the power unit 51 are disposed at a position vertically higher than when the movable member 53 is in its fore position (FIG. 2). This permits positioning the load bearing weight and the tractive forces of the wheels 36 so as to correspond with the area and tractive forces of the track 26 thereby allowing driving, steering and ground pressure to be adjusted. In the fore position, the wheels are disposed so as to raise the front portion of the track 26 off the ground, applying more ground bearing pressure on the wheels 36, so as to dramatically change the driving and steering geometry of the vehicle 10. Thus, the vehicle 10 can be stably propelled and steered with minimal disturbance to the earth's crust.

Figure 6:
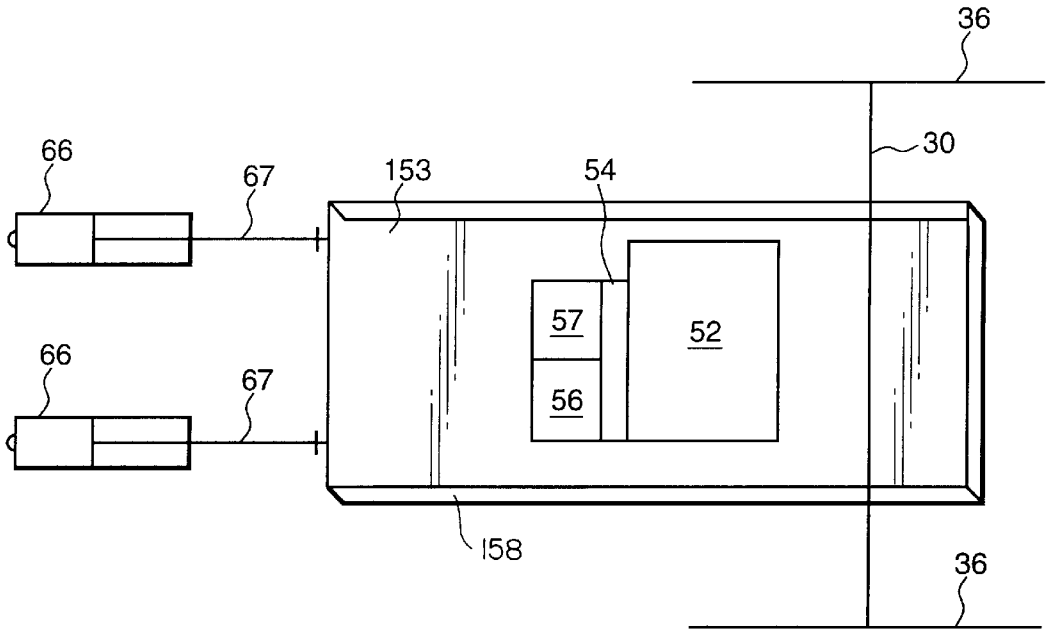
FIG. 6 is a schematic illustration showing another embodiment of the axle assembly and power unit of the vehicle mounted on a movable member.
Figure 7:
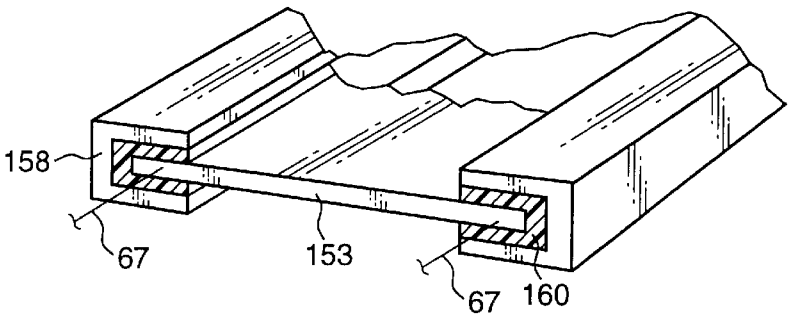
FIG. 7 is partial perspective view of an end of the movable member of FIG. 6.

It can be appreciated that the movable member 53 may be mounted for movement in many different ways. For example, as shown in FIGS. 6 and 7 instead of using bearings to permit movement of the movable member, the movable member 153 may be a flat plate mounted within a guide track 158. The track 158 may be fixed to or formed as an integral part of the frame structure 12. The guide track 158 is disposed along the inclined axis B (FIG. 5). The movable member 153 may be adapted to slide within the track fore and aft. The inside of the track may be lined with TEFLON or high molecular plastic 160 to reduce friction between the track and the movable member 153. Hydraulic cylinders 66 or other moving means may be coupled to the movable member to move the movable member 153 for and aft within the guide track in the manner discussed above.

Since the vehicle of the invention may traverse uneven terrain, there may be a need to compensate for any vehicle yaw. If one wheel rises with respect to the other, for example, if one wheel runs over a stump, oscillation of the vehicle and track mount may occur. This oscillation or yaw can be compensated for by providing, for example, shock absorbers, springs, or rubber blocks between the frame structure and wheel axles.

Figure 11:
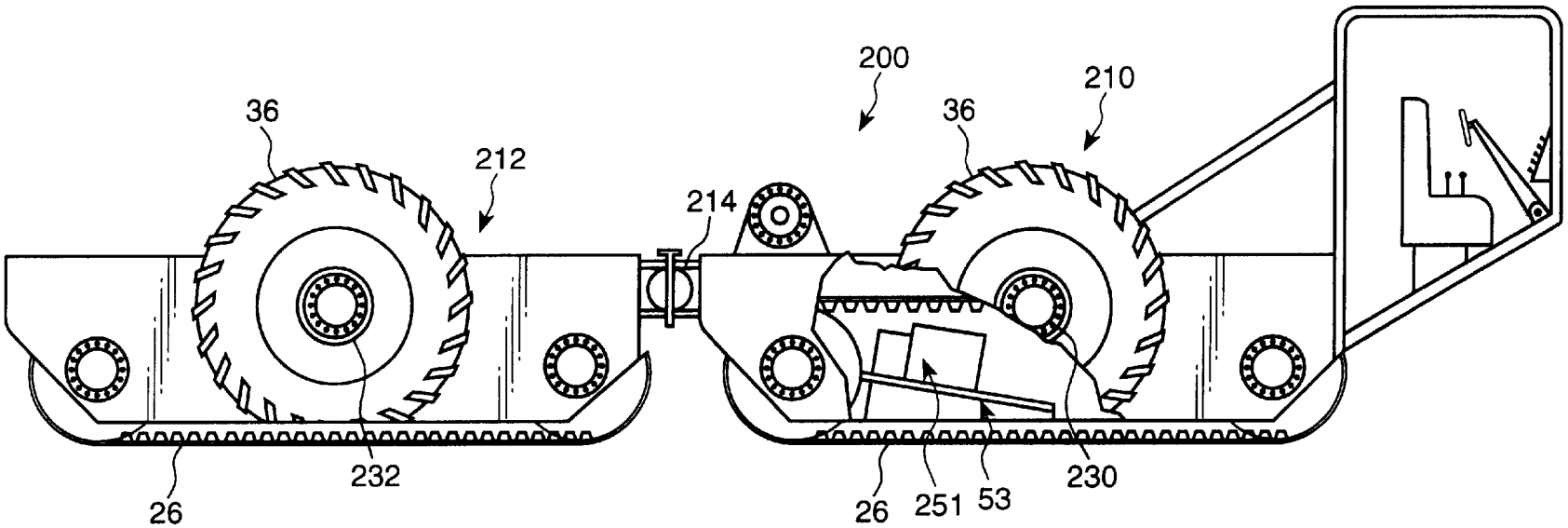
FIG. 11 is a schematic side view of a tandem carrier vehicle embodying the principles the present invention.

With reference to FIG. 11, a tandem carrier vehicle 200 is shown, embodying the principles of the present invention. The tandem vehicle 200 includes a front powered vehicle 210, which is substantially similar to the vehicle 10 of FIG. 1. However, vehicle 210 is provided with an articulated connection 214 at the aft end thereof. A rear vehicle 212 is coupled to vehicle 210 at the connection 214. It is within the contemplation of the invention to provide vehicles 210 and 212 with track profiles which are shorter than the profile of the single vehicle 10 of FIG. 1. Further, vehicle 210 may be provided with a fixed axle assembly 230, a vertically movable axle assembly or a movable axle assembly and movable power unit, with driven and steerable wheels, as discussed above. Vehicle 22.2 preferably has a fixed, axle assembly 232. The track and wheels of the rear vehicle 212 are driven by the power drive structure 251 of vehicle 210. Thus, the rear vehicle 212 includes the appropriate hoses originating from vehicle 210 providing the hydraulic power necessary to drive the track and wheels of the first and second vehicles, simultaneously.

It can be seen that the vehicle of the present invention may be driven and easily maneuverable over a variety of terrains without significantly damaging the earth's crust. Further, the vehicle can be configured in many different ways by providing the appropriate attachments. For example, winches, dozer and loader attachments can be provided in any desired manner so as to optimize the performance based upon the particular vehicle application.

It can be appreciated that the vehicle of the invention can be modified without departing from the principles of the invention. For example, although hydraulic power is disclosed for operating the vehicle, other known modes of power can be used. It is also within the contemplation of the invention to adjust the size of the vehicle so as to be employed as a child's toy. Thus, manual power, such as pedaling, or battery power may be used to propel such a vehicle. Further, the vehicle may be adapted for use as a recreational vehicle.

In addition, although the engine and/or power unit is disclosed as being mounted within the envelope of the track, it is within the contemplation of the invention to mount the engine and/or power unit anywhere on the vehicle. For example, the engine and/or power unit may be mounted near the operator's compartment. Further, the engine and/or power unit need not be movable, but may be fixed with respect to the main frame structure.

It thus will be seen that the objects of this invention have been fully and effectively accomplished. It will be realized, however, that the foregoing preferred embodiments of the present invention have been shown and described for the purposes of illustrating the structural and functional principles of the present invention and are subject to change without departure from such principles. Therefore, this invention includes all modifications encompassed within the spirit of the following claims.

What is claimed is:

1. A vehicle comprising:

a main frame structure, a track assembly mounted to said main frame structure and having endless ground-engaging track extending in a longitudinal direction, a pair of [steerable] ground-engaging wheels mounted with respect to the main frame structure such that each said wheel of said pair flanks said track, [said wheels being constructed and arranged to exert ground bearing pressure sufficient to change a direction of travel of said track in response to turning of said wheels so as to steer the vehicle] *said wheels and said track being con-*

*structed and arranged such that said wheels and a substantial portion of said track simultaneously engage a ground surface during normal operation of said vehicle with said track assembly supporting a majority of the weight of the vehicle,* steering structure operatively associated with said wheels [to turn said wheels],

*said steering structure being constructed and arranged to operate said wheels in response to operation of said steering structure such that said wheels exert ground bearing pressure sufficient to change a direction of said track so as to steer said vehicle,* and

*a* power drive [structure] *assembly* [mounted with respect to said main frame structure and constructed and arranged to drive said wheels and said track simultaneously so as to move the vehicle along the ground] *comprising a track-associated motor system associated with said track assembly and a wheel-associated motor system associated with said wheels, said power drive assembly being constructed and arranged to operate said track-associated motor system and said wheel-associated motor system so as to drive said track and said wheels, respectively, to move the vehicle along the ground, said power drive assembly being constructed and arranged such that said track-associated and said wheel-associated motor systems can be operated independently from one another so as to vary the amount of motive force applied by said wheels and said track.*

2. The vehicle according to claim [1] *44,* wherein said wheels are constructed and arranged to be moved with respect to said main frame structure so as to change a position thereof with respect to the main frame structure, thereby permitting driving, steering and ground bearing pressure of the vehicle to be adjusted in accordance with ground conditions.

3. The vehicle according to claim 1, wherein said wheels are coupled to an axle assembly at opposing ends of said axle assembly, said axle assembly being mounted with respect to said main frame structure so as to be disposed generally transverse to the longitudinal extent of said track.

4. The vehicle according to claim 3, wherein bounds of said track define an interior space, said axle assembly being mounted with respect to said main frame structure such that a portion of said axle assembly extends through said interior space.

5. The vehicle according to claim 4, wherein said axle assembly is constructed and arranged to be movable with respect to said main frame structure so as to change a position of said wheels with respect to the main frame structure, thereby permitting driving, steering and ground bearing pressure of the vehicle to be adjusted in accordance with ground conditions.

6. The vehicle according to claim 5, wherein said axle assembly is movable generally vertically with respect to said frame structure to adjust a vertical position of said wheels.

7. The vehicle according to claim 6, wherein said axle assembly is movable [an amount] *generally downwardly relative to said track* such that said wheels [lift at least] *apply a downwardly directed force to the ground to thereby cause* a portion of said track [from] *to be raised off the* ground [contact].

8. The vehicle according to claim 6, further comprising an air bag device operatively associated with said axle assembly for moving said axle assembly generally vertically.

9. The vehicle according to claim [1] *44*, wherein said frame structure has fore and aft ends and said track assembly is mounted centrally with respect to said main frame structure between said fore and aft ends.

10. The vehicle according to claim 4, wherein said power drive [structure] *assembly* includes an engine [,] *and* at least one hydrostatic pump driven by said engine, *said wheel-associated motor system including* at least one hydraulic motor coupled to said axle assembly and *said track-associated motor system including* at least one hydraulic motor coupled to said track assembly, said hydrostatic pump being fluidly connected to said hydrostatic motors for driving said track and said wheels, said engine and said hydrostatic pump defining a power unit.

11. The vehicle according to claim 10, wherein said power unit and said axle assembly are mounted on a movable member, said movable member being mounted with respect to said frame structure so as to be movable fore and aft within said interior space so as to change the fore and aft center of gravity of the vehicle.

12. The vehicle according to claim 11, wherein said movable member is movable such that when said movable member is disposed at a fore position, said wheels lift at least a fore end of said track from ground contact.

13. The vehicle according to claim 11, wherein said movable member is a flat plate mounted within a guide track so as to be slidable therein, said guide track being fixed to said main frame structure.

14. The vehicle according to claim 13, further comprising at least one hydraulic cylinder coupled to said flat plate for moving the flat plate within the guide track.

15. The vehicle according to claim 11, wherein said movable member is movable along a track member via bearings, said track member being fixed to said main frame structure.

16. The vehicle according to claim 1, wherein said wheels include rubber tires and said track is a rubber track.

17. The vehicle according to claim 1, wherein said steering structure is constructed and arranged to be operated hydraulically.

18. The vehicle according to claim [1] *44*, wherein said steering structure includes a steering unit and a hydraulic cylinder associated with each said wheel to move the associated wheel, said steering unit being hydraulically operated and fluidly coupled to the hydraulic cylinders for controlling turning movement of said wheels.

19. The vehicle according to claim 1, in combination with a second vehicle, said second vehicle including a second frame structure, a second track assembly mounted to said second frame structure and including an endless ground-engaging track, and a pair of [steerable] ground-engaging wheels mounted with respect to said second frame structure so as to flank the second track assembly, said power drive structure being constructed and arranged to drive the track and wheels of the first and second vehicles[, simultaneously].

20. The vehicle according to claim 10, wherein said hydraulic motors are constructed and arranged to be operated in such a manner that vehicle speed is determined by the number of motors selected to operate at one time.

21. The vehicle according to claim [1] *44*, wherein said wheels are disposed at a position vertically lower than a position of said track relative to said main frame structure, so that said wheels make ground contact at points deeper into the ground than points of track ground contact.

22. A vehicle comprising:

a main frame structure, a track assembly mounted generally centrally with respect to said main frame structure and having a single, endless ground-engaging track extending in a longitudinal direction, a pair of [steerable] ground-engaging wheels mounted with respect to the main frame structure such that each said wheel of said pair flanks said track, [said wheels being constructed and arranged to exert ground bearing pressure sufficient to change a direction of travel of said track in response to turning of said wheels to steer the vehicle,]

steering structure operatively associated with said wheels to turn said wheels,

*said steering structure being constructed and arranged to operate said wheels in response to operation of said steering structure such that said wheels exert ground bearing pressure sufficient to change a direction of travel of said track so as to steer said vehicle,* and power drive structure mounted with respect to said main frame structure and constructed and arranged to drive said wheels and said track simultaneously so as to move the vehicle along the ground, said wheels being movable with respect to said main frame structure so as to change a position of said wheels with respect to the frame structure, thereby permitting driving, steering and ground bearing pressure of the vehicle to be adjusted in accordance with ground conditions.

23. The vehicle according to claim 22, wherein said wheels are coupled to an axle assembly at opposing ends of said axle assembly, said axle assembly being mounted with respect to said main frame structure so as to be disposed generally transverse to the longitudinal extent of said track.

24. The vehicle according to claim 22, wherein said steering structure is constructed and arranged to be operated hydraulically.

25. The vehicle according to claim 22, wherein said main frame structure has fore and aft ends and said track assembly extends substantially between said fore and aft ends.

26. The vehicle according to claim 22, wherein said wheels are mounted for vertical movement with respect to said main frame structure.

27. The vehicle according to claim 23, wherein said axle assembly is constructed and arranged to be movable generally vertically to adjust a vertical position of said wheels.

28. The vehicle according to claim 27, wherein said axle assembly is movable [an amount] *generally downwardly relative to said track* such that said wheels [lift at least] *apply a downwardly directed force to the ground to thereby cause* a portion of said track [from] *to be raised off the* ground [contact].

29. The vehicle according to claim 27, further comprising an air bag device operatively associated with said axle assembly for moving said axle assembly generally vertically.

30. The vehicle according to claim 23, wherein said power drive structure includes an engine, at least one hydrostatic pump driven by said engine, at least one hydraulic motor coupled to said axle assembly and at least one hydraulic motor coupled to said track assembly, said hydrostatic pump being fluidly connected to said hydrostatic motors for driving said track and said wheels, said engine and said hydrostatic pump defining a power unit.

31. The vehicle according to claim 30, wherein said hydraulic motors are constructed and arranged to be operated in such a manner that vehicle speed is determined by the number of motors selected to operate at one time.

32. The vehicle according to claim 30, wherein bounds of said track define an interior space, said power unit and a substantial portion of said axle assembly being disposed within said interior space.

33. The vehicle according to claim 32, wherein said power unit and said axle assembly are mounted on a movable member, said movable member being mounted with respect to said frame structure so as to be movable fore and aft within said interior space so as to change the fore and aft center of gravity of the vehicle.

34. The vehicle according to claim 33, wherein said movable member is movable such that when said movable member is disposed at a fore position, said wheels lift at least a fore end of said track from ground contact.

35. The vehicle according to claim 32, wherein said movable member is a flat plate mounted within a guide track so as to be slidable therein, said guide track being fixed to said main frame structure.

36. The vehicle according to claim 35, further comprising at least one hydraulic cylinder coupled to said flat plate for moving the flat plate within the guide track.

37. The vehicle according to claim 33, wherein said movable member is movable along a track member via bearings, said track member being fixed to said main frame structure.

38. The vehicle according to claim 22, wherein said wheels include rubber tires and said track is a rubber track.

39. The vehicle according to claim 25, further comprising a dozer blade mounted with respect to said frame structure at the fore end thereof.

40. The vehicle according to claim [22] *45*, wherein said steering structure includes a steering unit operatively associated with said wheels for controlling steering of the vehicle.

41. The vehicle according to claim 40, wherein said steering structure includes a hydraulic cylinder associated with each said wheel, said steering unit being hydraulically operated and fluidly coupled to the hydraulic cylinders for controlling steering of said wheels.

42. A tandem vehicle comprising:

a first vehicle including:

a main frame structure, a track assembly mounted generally centrally with respect to said main frame structure and having a single, endless ground-engaging track extending in a longitudinal direction, a pair of [steerable] ground-engaging wheels mounted with respect to the main frame structure such that each said wheel of said pair flanks said track, [said wheels being constructed and arranged to exert ground bearing pressure sufficient to change a direction of travel said track in response to turning of said wheels to steer the first vehicle,]

steering structure operatively associated with said wheels [to turn said wheels],

*said steering structure being constructed and arranged to operate said wheels in response to operation of said steering structure such that said wheels exert ground bearing pressure sufficient to change a direction of travel of said track so as to steer said vehicle,* power drive structure mounted with respect to said main frame structure and constructed and arranged to drive said wheels and said track simultaneously so as to move the first vehicle along the ground, said wheels being movable with respect to said main frame structure so as to change a position of said wheels with respect to the frame structure, thereby permitting driving steering, and ground bearing pressure of the first vehicle to be adjusted in accordance with ground conditions, a second vehicle coupled to an aft end of said first vehicle, said second vehicle including a second frame structure, a second track assembly mounted to said second frame structure and including an endless ground-engaging track, and a pair of [driven and steerable] *drivable* ground-engaging wheels mounted with respect to said second frame structure so as to flank the second track assembly, said power drive structure being constructed and arranged to drive the track and wheels of the first and second vehicle[, simultaneously].

43. A tandem vehicle comprising:

a first vehicle including:

a main frame structure, a track assembly mounted to said main frame structure and having an endless ground-engaging track extending in a longitudinal direction, a pair of [steerable] ground-engaging wheels mounted with respect to the main frame structure such that said wheels flank said track, [said wheels being constructed and arranged to exert ground bearing pressure sufficient to change a direction of travel of said track in response to turning of the wheels to steer the first vehicle,]

steering structure operatively associated with said wheels [to turn said wheels],

*said steering structure being constructed and arranged to operate said wheels in response to operation of said steering structure such that said wheels exert ground bearing pressure sufficient to change a direction of travel of said track so as to steer said vehicle,* and power drive structure mounted with respect to said main frame structure and constructed and arranged to drive said wheels and said track [simultaneously] so as to move the first vehicle along the ground, and a second vehicle coupled to an aft end of said first vehicle, said second vehicle including:

a second main frame structure, a second track assembly mounted to said second main frame structure and having an endless ground-engaging track extending in a longitudinal direction, a pair of [steerable] ground-engaging wheels mounted with respect to the second main frame structure such that said wheels flank said track, [said wheels being constructed and arranged to exert ground bearing pressure sufficient to change a direction of travel of sad second track in response to turning of the wheels of the second track,]

said track and said wheels of said second vehicle being operatively coupled to said power drive structure of said first vehicle such that said power drive structure of said first vehicle drives said wheels and track of said first vehicle together with said wheels and track of said second vehicle.

*44. A vehicle according to claim 1, wherein said steering structure is constructed and arranged to pivotally turn said wheels about a pair of generally parallel, vertically extending axes in response to operation of said steering structure so as to steer said vehicle.*

*45. A vehicle according to claim 22, wherein said steering structure is constructed and arranged to pivotally turn said wheels about a pair of generally parallel, vertically extending axes in response to operation of said steering structure so as to steer said vehicle.*

*46. A tandem vehicle according to claim 42, wherein said steering structure is constructed and arranged to pivotally turn said wheels of said first vehicle about a pair of generally parallel, vertically extending axes in response to operation of said steering structure so as to steer said first vehicle.*

*47. A tandem vehicle according to claim 43, wherein said steering structure is constructed and arranged to pivotally turn said wheels of said first vehicle about a pair of generally parallel, vertically extending axes in response to operation of said steering structure so as to steer said first vehicle.*

*48. A vehicle comprising:*

*a main frame,*

*a track assembly mounted to said main frame structure and having an endless ground-engaging track extending in a longitudinal direction,*

*a pair of ground-engaging wheels mounted with respect to the main frame structure such that each said wheel of said pair flanks said track, said wheels and said track being constructed and arranged such that, when said vehicle is being driven over a substantially flat ground surface, said wheels and at least a substantial portion of said track can be simultaneously engaged with the ground without the need for deforming the configuration of said wheels,*

*steering structure operatively associated with said wheels,*

*said steering structure being constructed and arranged to operate said wheels in response to operation of said steering structure such that said wheels exert ground bearing pressure sufficient to change a direction of said track so as to steer said vehicle, and*

*power drive structure mounted with respect to said main frame structure and constructed and arranged to drive said wheels and said track while said wheels and said track are simultaneously engaged with the flat ground surface so as to move the vehicle along the ground.*

* * * * *